Feb. 9, 1954 J. M. POCHE 2,668,736
VEHICLE WHEEL
Original Filed Aug. 14, 1950

INVENTOR.
John Morris Poche
BY John H. Ruckman
Attorney

Patented Feb. 9, 1954

2,668,736

UNITED STATES PATENT OFFICE 2,668,736

VEHICLE WHEEL

John Morris Poche, Mississippi City, Miss.

Original application August 14, 1950, Serial No. 179,108. Divided and this application August 6, 1951, Serial No. 240,547

3 Claims. (Cl. 301—41)

This invention relates to vehicle wheels. These wheels may be attached to tractors such as farm tractors as well as to amphibious vehicles. This application is a division of my previous application Serial Number 179,108 filed Aug. 14, 1950.

An object of this invention is to provide a wheel whereby a vehicle will travel over such terrain as snow, ice, sand, and over land in semi-liquid state, or the wheel may be completely water borne.

Another object is to provide a wheel for attachment to a vehicle whereby such vehicle when provided with several of the wheels have increased traction.

Another object is to provide a wheel for attachment to a vehicle, said wheel being constructed to provide a flat surface on its bottom to increase the ground pressure area by means of a minimum of mechanism and at the same time providing an even rolling wheel.

These objects I have accomplished by the means which are now to be described in detail and claimed, it being understood that changes in the precise embodiment of invention herein disclosed can be made within the scope of what is claimed without departing from the spirit of the invention.

The novel features which I believe characteristic of this invention are set forth with particularity in the appended claims. The invention itself, however, both as to organization and manner of operation, together with all objects and advantages thereof will be best understood from the following description of a specific embodiment when read in connection with the accompanying drawing in which, Fig. 1 is a side view of the wheel.

Figure 3:
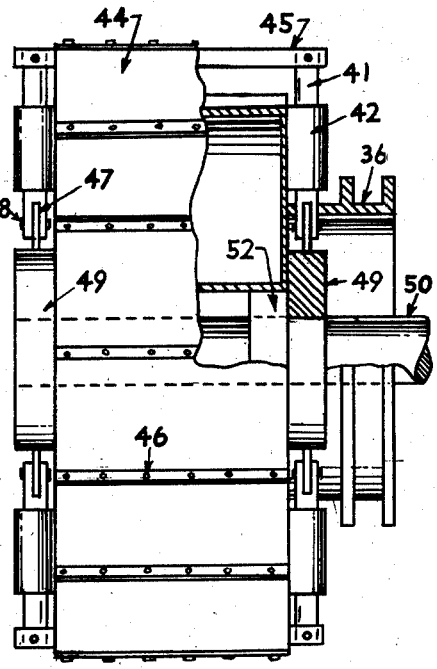
Fig. 3 is an end view of the wheel taken on the line 3—3 of Fig. 1.

Referring to the construction shown in the drawing, the numeral 21 designates a wheel. This wheel is provided with a plurality of struts 41 radially disposed and equally spaced from each other and held in place by guides 42 secured to the wheel. The struts 41 produce and increase in the tractive engagement with the ground by pushing at proper times on associated flexible members 44 the ends of which are secured to the wheel. Cross bars 45 which engage the middle of the flexible members respectively cause alternate stretching and relaxing of the flexible members which are secured at their ends respectively to the wheel by attaching members 46. Rollers 47 are secured by pins 48 to the inner ends of the struts 41. These rollers run on the edge of cams 49 secured to the axle 50. The axle as it passes through the wheel is fixed in a support 52 as indicated in Fig. 3. The numeral 36 designates a member secured to the side of the wheel and constituting a portion of the driving mechanism for the wheel.

The operation and advantages of this wheel will be apparent in connection with the foregoing description and the accompanying drawing. As the cams 49 fixed and act on the struts, the flexible members 44 will in succession be stretched for engagement with the ground as shown in Fig. 1 and thereby provide the increased tractive area previously mentioned.

Figure 1:
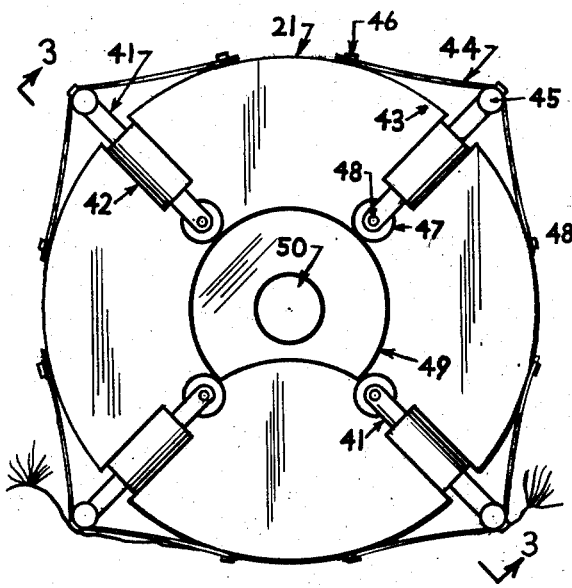
Figure 2:
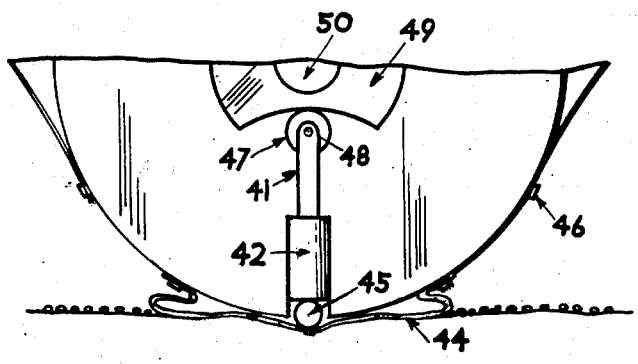
Fig. 2 is a side view of a portion of the wheel of Fig. 1 but having a flexible element retracted.

The purpose of alternately stretching and relaxing the flexible members 44 is that when a flexible member comes into engagement with the ground as shown in Fig. 2, then shocks are decreased when the wheel runs over bumpy or uneven ground; when the flexible member during rotation of the wheel is temporarily stretched as shown in Fig. 1, then the tractive area of the wheel is increased.

I claim:

1. In a device of the character described, the combination of a wheel, a plurality of flexible members having their ends secured in succession around said wheel, a fixed axle, a cam secured to said axle, the cam having a cut-out in its lower margin, a plurality of equal radial struts slidably mounted in said wheel and having their inner ends adapted to bear in succession on the margin of said cam and their outer ends adapted to bear on the center of the associated flexible members, and means for rotating said wheel around said fixed axle.

2. In a device of the character described the combination of a wheel, a plurality of flexible members having their ends secured in succession around said wheel, a fixed axle, a cam secured to said axle, the cam having a cut-out in its lower margin, a plurality of equally spaced guides secured to said wheel, equal radial struts slidably mounted in said guides respectively and having their inner ends adapted to bear in succession on the margin of said cam and their outer ends adapted to bear on the center of the associated flexible members, and means for rotating said wheel around said fixed axle.

3. In a device of the character described, the combination of a wheel, a plurality of flexible members having their ends secured in succession around said wheel, a fixed axle, two spaced cams secured to said axle, said cams having cut-outs in their lower margins, a plurality of equally spaced guides secured to both sides of said wheel, equal radial struts slidably mounted in said guides respectively and having their inner ends adapted to bear in succession on the margins of said cams respectively and the outer ends adapted to bear on the center of the associated flexible members, and means for rotating said wheel around said fixed axle.

JOHN MORRIS POCHE.

References Cited in the file of this patent

UNITED STATES PATENTS

| Number | Name | Date |
|---|---|---|
| 1,957,460 | Ice | May 8, 1934 |